United States Patent [19]
Schaeffler et al.

[11] 3,797,083
[45] Mar. 19, 1974

[54] SHEET METAL CAGE PRODUCTION

[75] Inventors: Georg Schaeffler; Gerhard Sakowski, both of Herzogenaurach, Germany

[73] Assignee: Industriewerk Schaeffler OHG, Herzogenaurach, Germany

[22] Filed: Sept. 15, 1972

[21] Appl. No.: 289,303

[30] Foreign Application Priority Data
Sept. 22, 1971 Germany............................ 2147170

[52] U.S. Cl............................ 29/148.4 C, 113/117
[51] Int. Cl............................................. B21d 53/12
[58] Field of Search. 29/148.4 C, 148.4 R, 148.4 A, 29/163.5; 113/117

[56] References Cited
UNITED STATES PATENTS
| | | | |
|---|---|---|---|
| 3,204,323 | 9/1965 | Schaeffler | 29/148.4 C |
| 3,365,775 | 1/1968 | Cavagnero et al. | 29/148.4 C |
| 3,526,026 | 9/1970 | Warehol | 29/148.4 C |

*Primary Examiner*—Thomas H. Eager
*Attorney, Agent, or Firm*—Hammond & Littell

[57] ABSTRACT

A novel process for the production of sheet metal cages for cylindrical rollers comprising two end rings shaped as radially directed flanges and cross-bars connecting the end rings having several axis parallel sections at different distances from the cage axis comprising a. shaping without cutting a sheet metal strip having a uniform thickness over its entire area to provide two lateral areas having a greater thickness than the central region, b. shaping the central area of the sheet metal strip according to the final cross-bars and in the two lateral areas to form radially directed end rings such that the greater thickness of the lateral areas lie after shaping in the area of the end rings and the adjacent cross-bar ends, c. punching out the central area to form the cross-bars forming the pockets to accommodate the rollers and d. bending the sheet metal strip into a cylindrical and joing the abutting ends of the end rings, steps b and c can be in any desired sequence.

3 Claims, 8 Drawing Figures

3,797,083
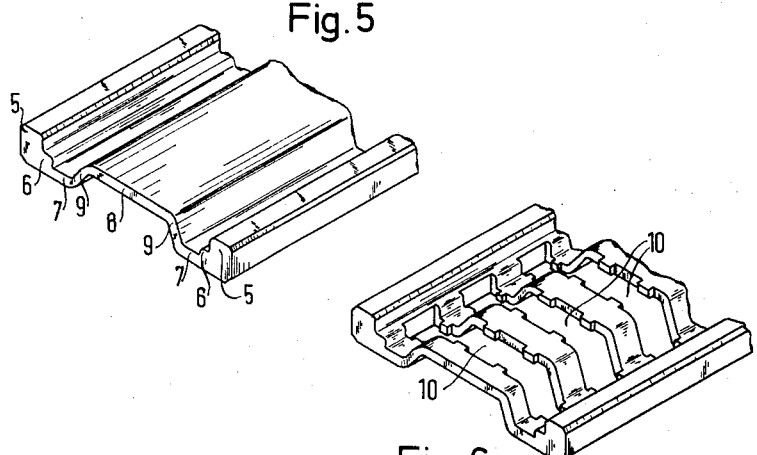
Fig. 5
Fig. 6
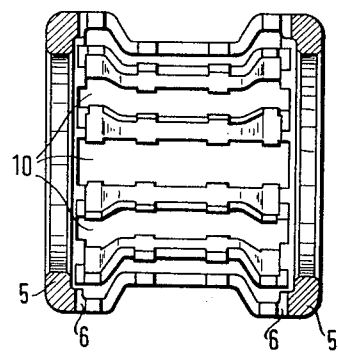
Fig. 7
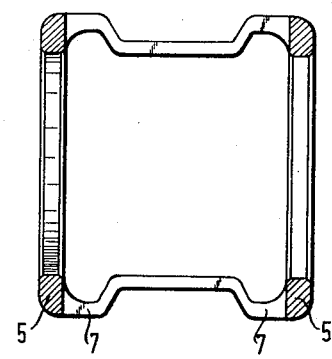
Fig. 8

SHEET METAL CAGE PRODUCTION

STATE OF THE ART

Sheet metal cages of this type have been produced by various methods. For example, a flat sheet metal strip is rolled to provide the desired profile to the cross-bar section thereof and then the pockets for the cylindrical rollers are formed by stamping either before or after said shaping and the strip is then bent into a cylindrical shape and the abutting ends are joined such as by welding. In such a production method, the lateral end rings of the cage have been reduced radially to form radially directed flanges during the rolling operation which results in an increase in the cross-section of the end rings and thereby provides a stiffening of the cage.

Another known method for producing cages of this type begins with a cylindrical section which formed into the desired profile by shaping without cutting such as a rolling operation and in such a process wherein the end rings are not radially directed, the end rings have been provided with a thicker cross-section.

However, it has now been found that stiffening of the cage by enlarging the cross-section is not the only important thing but under certain operating conditions, the critical or stress points in such cages appear to lie at the transition of the cross-bars into the end rings and breaks caused by vibrations occassionally occur at these points.

OBJECTS OF THE INVENTION

It is an object of the invention to provide a novel process for the preparation of cages with strengthened areas at the meeting of the cross-bars and the end rings to insure no vibration breaks.

It is another object of the invention to provide a simple economical process for providing cages by enlarging the transition point of cross-bars and end rings.

These and other objects and advantages of the invention will become obvious from the following detailed description.

THE INVENTION

The novel process for the preparation of a sheet metal cage for cylindrical rollers comprises a. shaping without cutting a sheet metal strip having a uniform thickness over its entire area to provide two lateral areas having a greater thickness than the central region, b. shaping the central area of the sheet metal strip according to the final cross-bars and in the two lateral areas to form radially directed end rings such that the greater thickness of the lateral areas lie after shaping in the area of the end rings and the adjacent cross-bar ends, c. punching out the central area to form the cross-bars forming the pockets to accommodate the rollers and d. bending the sheet metal strip into a cylindrical and joining the abutting ends of the end rings such as by welding. Steps b and c may be in any desired sequence, i.e., the sequence of steps b and c can be reversed.

This method makes it possible to achieve without additional expenditure that the thicker cross-section is present not only in the area of the end rings of the cage, but that it extends moreover into the end region of the cross-bars. By this cross-section enlargement in the critical area at the transition of the cross-bar ends into the end rings, experiments have shown that vibration breaks occurring at this point are avoided with certainty.

Process step a can advantageously be carried out so that, starting with a sheet metal strip having a thickness corresponding to the desired later thickness in the end regions, this sheet metal strip is reduced by rolling in its central region to a small thickness. In this rolling operation, a certain widening of the strip will occur due to the occurring material displacement which must be taken into account. However, the same result can be obtained by starting with a sheet metal strip having a thickness which corresponds to the desired later thickness in the central region and enlarging this strip to a greater thickness in its end regions by swaging. The swaging can take place in any conceivable known manner.

Referring now to the drawings.

FIG. 5 is a perspective view of a sheet metal strip of FIGS. 2 and 4 after shaping of the cage profile and FIG. 6 is a perspective view of the profiled strip of FIG. 5 after punching of the pockets.

FIG. 7 is a longitudinal view of the cylindrical cage formed by bending of the strip of FIG. 6 and FIG. 8 is a simplified representation of the cage profile of FIG. 7.

Figure 1:
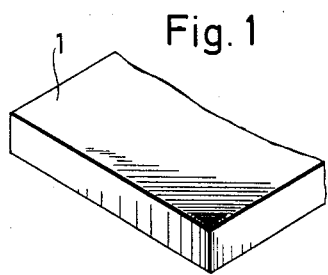
FIGS. 1 and 3 are a perspective view of a starting sheet metal strip.
Figure 2:
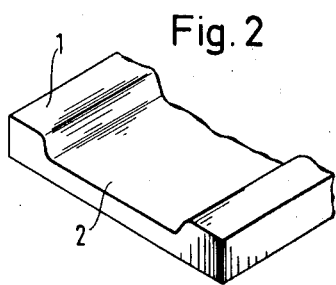
FIG. 2 is a perspective view of the same strip as FIG. 1 after rolling to make the central region thinner and FIG. 4 is a perspective view of the same strip as FIG. 3 after swaging the lateral ends thereof.

In FIG. 1, a flat sheet metal strip 1 has a uniform thickness over its entire extent and in FIG. 2 this sheet metal strip 1 has been rolled out in its central region 2 to a smaller thickness. With this rolling process, there will appear a widening of sheet metal strip 1 which however, was disregarded in FIG. 2.

Figure 3:
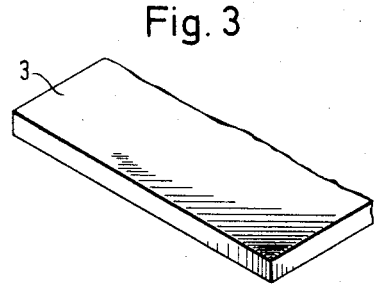
Figure 4:
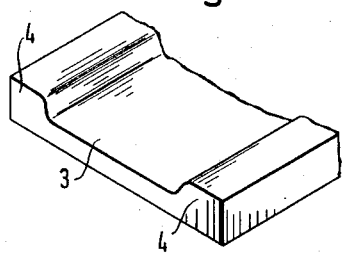

FIG. 3 shows a sheet metal strip 3 which has a smaller thickness than the sheet metal strip 1 of FIG. 1 and FIG. 4 shows this sheet metal strip 3 after it has been swaged in its lateral regions 4 so that a cross-section enlargement has been achieved there.

FIG. 5 shows a sheet metal strip preshaped as in FIG. 2 or 4 after it has been profiled into its final cross-section form of the final cage by a further rolling operation. In the region of the end rings 5 and cross-bar ends 6 adjacent thereto, this profile has a greater thickness than in the remaining central region, which is comprised of the two outer axis-parallel cross-bar parts 7 which in the finished cage provide the retention of the roller toward the outside in a known manner, the inner axis-parallel cross-bar part 8, which provides the roller retention toward the inside, and the two obliquely extending sections 9 connecting parts 7 and 8.

FIG. 6 shows the sheet metal strip of FIG. 5 after the next process step of punching of the pockets 10 for the later accommodation of the cylindrical rollers. Finally FIG. 7 shows the cage as it results after the bending of the strip of FIG. 6 into a cylinder and it can clearly be seen from this figure how the cross-section enlargement of the end rings 5 continues into the end region 6 of the cross-bars.

In FIG. 8, an embodiment of a finished cage is shown which is modified as compared with that of FIG. 7 insofar as the end rings 5 still fully correspond to those according to FIG. 7, while in the adjacent transition region from the end rings 5 into the axis-parallel crossbar parts 7, this cage is designed so that a very gradual transition from the thicker to the thinner wall occurs. For greater clarity of the drawing only, only the crossbars at the top and bottom are shown in FIG. 8, while the other cross-bars have been omitted.

Various modifications of the process of the invention may be made without departing from the spirit or scope thereof and it is to be understood that the invention is to be limited only as defined in the appended claims.

We claim:

1. A method for the production of a sheet metal cage for cylindrical rollers consisting of two end rings profiled as radially directed flanges connected by a plurality of cross-bars profiled with several axis-parallel sections at varying distance from the cage axis comprising a. shaping without cutting a sheet metal strip having a uniform thickness over its entire area to provide two lateral areas having a greater thickness than the central region, b. shaping the central area of the sheet metal strip according to the final cross-bars and in the two lateral areas to form radially directed end rings such that the greater thickness of the lateral areas lie after shaping in the area of the end rings and the adjacent cross-bar ends, c. punching out the central area to form the cross-bars forming the pockets to accommodate the rollers and d. bending the sheet metal strip into a cylindrical and joining the abutting ends of the end rings, steps b and c can be in any desired sequence.

2. The method of claim 1 wherein the cross-section of the sheet metal strip is reduced in the central portion by rolling.

3. The method of claim 1 wherein the cross-section of the lateral areas of the sheet metal strip is increased by swaging.

* * * * *